March 7, 1972  L. TRUXA  3,647,620
DRAINAGE FOIL FOR A PAPERMAKING MACHINE
Filed May 2, 1969
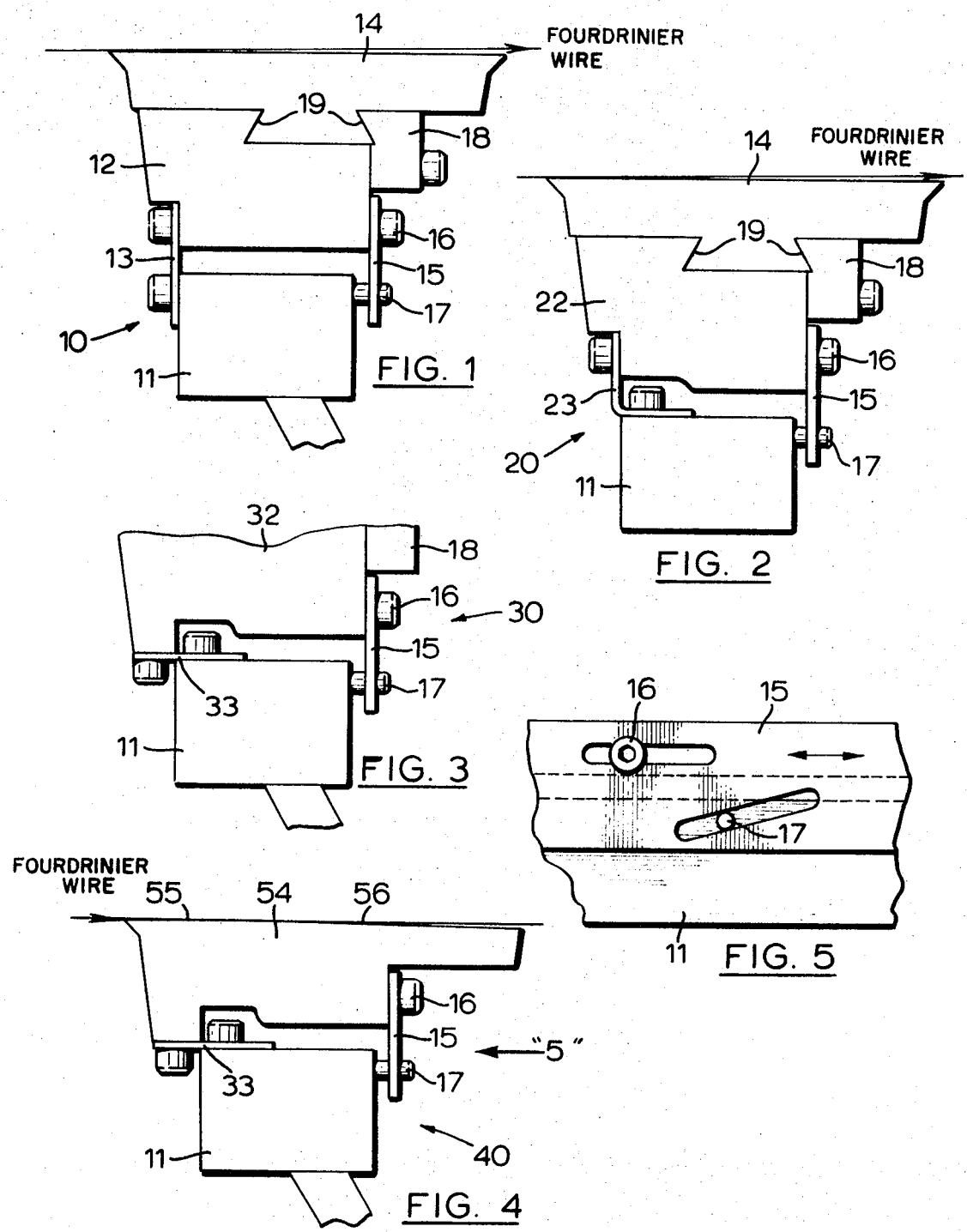
INVENTOR.
LESLIE TRUXA
BY
Patent Agent

United States Patent Office 3,647,620
Patented Mar. 7, 1972

3,647,620
DRAINAGE FOIL FOR A PAPERMAKING MACHINE
Leslie Truxa, Montreal, Quebec, Canada, assignor to Dominion Engineering Works, Limited, Lachine, Quebec, Canada
Filed May 2, 1969, Ser. No. 821,218
Claims priority, application Canada, May 14, 1968, 19,919
Int. Cl. D21f 1/48
U.S. Cl. 162—211                                    10 Claims

ABSTRACT OF THE DISCLOSURE

A drainage foil which includes a non-flexing foil section having a top surface leading portion and a top surface trailing portion. The foil section is mounted on a lower support section by a plate spring located beneath the top surface leading portion of the foil section and a cam bar adjustment system located beneath the top surface trailing portion. Adjustment of the cam bar system results in angular tilting of the foil section about the plate spring such that the leading portion of the foil section remains in contact with a fourdrinier wire but bending of the foil section is avoided.

DESCRIPTION OF THE INVENTION

This invention is directed to a method of positioning a foil structure, and to apparatus for carrying out the method.

In the production of pulp products the extraction of water is of great importance, as in the fourdrinier section of a paper machine, and for this purpose adjustable foil sections are widely used.

Owing to the extreme lengths of foil involved, the arduous environment and the very close tolerances entailed, the structure and costs of such adjustable foils are significant.

The present invention provides an improved foil support arrangement in which the foil section is resiliently secured to the foil support, providing a simplified and readily adjustable foil arrangement. It has been found that plate springs secured to the foil section and the foil support provide a flexural relationship, which in conjunction with a suitable cam bar adjustment or other mechanical interconnection between the foil section and its support structure provide a low cost and reliable foil mounting arrangement.

A further characteristic of the present invention is the suitability of the subject support structure for use with reversible foil sections, in which the foil working surface is plane, and the nose and the tail of the foil are symmetrical, to permit the foil to be reversed, so as to substantially extend the working life of the foil wearing face.

A further embodiment adapted for use with the resilient mounting comprises a foil section wherein the foil trailing section is provided with an angle of divergence from the leading or nose portion of the foil. By adopting a divergence angle of about 1 degree, then the provision of a further 3 degrees of flexing provides a total of 4 degrees of inclination from the plane of the fourdrinier wire, which meets the usual range of adjustment required.

In conjunction with the foregoing arrangement it is contemplated that a coating surface of high wearing or easy replacement capability may be applied to the leading or nose surface.

While the following embodiments are directed to the utilization of plate springs, generally in short lengths, it is contemplated that alternative resilient mounting means may be substituted therefor.

Certain embodiments of the present invention are described, reference being had to the accompanying drawings wherein:

FIG. 1 is an embodiment of the arrangement showing a vertical plate spring and a reversible foil;

FIG. 2 shows the use of a cranked plate spring;

FIG. 3 shows a horizontal plate spring;

FIG. 4 shows a horizontal plate spring and a relieved foil section; and

FIG. 5 is a view taken in the direction of arrow 5 in FIG. 4.

Referring to FIG. 1 the foil arrangement 10 comprises a lower support section 11 having an upper support portion 12 resiliently attached thereto by way of a number of plate springs 13, shown attached by cap screws. At the rear of the foil support sections a cam bar 15 is secured to the portion 12 by a cap screw 16, having a stud 17 extending from the section 11 passing through a slot in the cam bar 15. A view of the cam bar 15 and the related orientation of the slots, cap screw 16 and stud 17 is shown in FIG. 5.

The foil section 14 is illustrated having a dove tail section 19 which is secured to the upper support portion 12 by means of a retaining section 18, shown attached to the portion 12 by means of a cap screw or like securing device.

The embodiment illustrated in FIG. 2 differs from that of FIG. 1 in the use of a cranked plate spring 23 which serves to conceal the attachment of the spring 23 to the section 11 of the support structure.

In the embodiment illustrated in FIG. 3 a horizontal plate spring 33 is employed, providing a further improvement in the attachment to the upper support portion 32. This provides a clean front to the foil arrangement, so that splashing is minimized.

Referring to the embodiment illustrated in FIG. 4, the foil section 54 has a coated top surface leading portion 55 and is provided with an angularly relieved top surface trailing portion 56, the angular relief being in the order of 1 degree, thereby minimizing the necessary range of movement in order to provide a working range of adjustment from 1 degree to 4 degrees with a 3 degree adjustment. Also, the spring 33 is attached directly to the foil section 54, as is the cam plate 15, by way of cap screws 16.

It will be evident that owing to the location of the support spring rearwardly of the foil nose, in order to provide suitable drainage conditions and to avoid splash, the geometry of the arrangement will provide a slight raising of the nose of the foil. However the extent of this variation may be adjusted by a vertical displacement of the mounted foil. In relation to the embodiment illustrated in FIG. 4, it will be seen that by reducing the extent of necessary angular adjustment, the corresponding vertical deviation of the nose portion is minimized.

In addition to simplification of arrangement, the present invention leads to enhanced machining characteristics and improved serviceability, with consequent reductions in machine down time.

Further significant advantages provided by the present invention include the fact that owing to the change in foil attitude being provided by in-situ canting, as compared with bodily displacement of the foil and its support structure, it is possible to mount a plurality or gang of foils on a single support structure with each foil retaining its individual capability of independent adjustment. Also, by resiliently mounting the foil it is possible to utilize brittle, hard wearing materials such as ceramics in the manufacture of the foil or its wearing surface, as there is no requirement to provide flexure of the foil working surfaces, i.e., a foil of non-flexing cross section may be utilized.

What I claim as new and desire to secure by Letters Patent of the United States is:

1. An adjustable foil structure for use in liquid extraction from a web travelling on an endless web support wire of a wet forming section, comprising: an elongated foil section having a substantially non-flexing cross section with a top surface including a top surface leading portion to provide supporting contact with a said wire and a trailing portion, foil section support means comprising a rigid lower support section and a moveable upper support portion substantially co-extensive therewith secured to said foil section in supporting relation, resilient mounting means connecting said lower support section with said upper support portion on the side thereof in the oncoming direction of said wire when travelling, to permit variation in the inclination of the upper support portion and the foil section relative to the lower support section, while maintaining said foil top surface leading portion in supporting relation with said wire, and adjustment means attached at regular intervals, spaced in a downstream direction from said resilient mounting means for adjusting the relation between said upper support portion and the lower support section, to selectively vary the inclination of said moveable upper support portion relative to the plane of a said wire, whereby the inclination of said foil section to said wire may be controlled.

2. The structure as claimed in claim 1 wherein said resilient mounting means comprises a plate spring.

3. The structure as claimed in claim 2 wherein said plate spring is cranked.

4. The structure as claimed in claim 1 wherein said foil section is substantially symmetrical in relation to the fluid extraction function, whereby the foil section may be employed effectively utilizing either the leading portion or the trailing portion in facing relation with an oncoming fourdrinier wire.

5. The structure as claimed in claim 1, wherein said foil section top surface comprises a substantially plane leading portion and a trailing portion, the top surface of the trailing portion being inclined from the top surface of the leading portion by a slight angle in the range of 0 to 1 degree.

6. The structure as claimed in claim 1, wherein said top surface leading portion is coated with a hard wearing surface.

7. The structure as claimed in claim 1 wherein the cross sectional arrangement of said foil section is substantially symmetrical about an axis of symmetry extending in the cross-wire direction, whereby said foil top surface leading portion may be reversed and utilized as a trailing surface portion in extracting water from a said wire.

8. The structure as claimed in claim 7 wherein said foil section is secured by dovetailing to said upper support portion.

9. An adjustable foil structure for use in extracting liquid from a web travelling on an endless wire, comprising an elongated foil section having a substantially rigid non-deformable cross-section with a top surface providing support to a said wire, the foil section longitudinal axis extending horizontally in a direction normal to the direction of wire travel, the foil section having a top surface includign a top surface leading portion and a top surface trailing portion, relative to wire movement; a rigid lower foil support section extending transversely of the wire substantially coextensive with the foil portion; elongated plate spring means extending along said support section connecting said lower foil support section to said foil section and being located substantially directly below said top surface leading portion to permit canting of the foil section while maintaining said top surface leading portion in supporting relation with the wire; and foil adjustment means spaced from said spring means in the direction of wire travel interconnecting said lower foil support section and said foil section to provide selective variation of the inclination of the foil top surface relative to the plane of said wire, whereby the liquid extraction effect of said foil may be selectively controlled.

10. The method of positioning a non-flexing section having a top surface leading portion and a top surface trailing portion in relation to a moving web support wire for selective removal of water from a web carried on the support wire remotely of the foil, comprising the steps of positioning the top surface leading portion of the foil section in contacting relation with the moving wire, supporting said foil section on a fixed lower support section located beneath the top surface leading portion by resilient means, maintaining the top surface leading portion in substantially unvarying contact with said web support wire, providing adjustment means connecting the top surface trailing portion with the fixed lower support section, and adjusting the adjustment means to vary the angle between said top surface and said web support wire wereby the foil section deflects about said resilient support means and the effective angle of the foil in water extracting relation with the moving wire is thereby controlled without flexing the foil section.

References Cited

UNITED STATES PATENTS

| | | | |
|---|---|---|---|
| 3,520,775 | 7/1970 | Truxa | 162—352 |
| 3,140,225 | 7/1964 | Truxa | 162—352 |
| 3,393,124 | 7/1968 | Klingler et al. | 162—352 |

S. LEON BASHORE, Primary Examiner

R. H. TUSHIN, Assistant Examiner

U.S. Cl. X.R.

162—352